United States Patent
Snyder (10) Patent No.: US 10,260,523 B2
(45) Date of Patent: Apr. 16, 2019

(54) FLUID COOLING SYSTEM INTEGRATED WITH OUTLET GUIDE VANE

(71) Applicant: Rolls-Royce North American Technologies, Inc., Indianapolis, IN (US)

(72) Inventor: Douglas J. Snyder, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 432 days.

(21) Appl. No.: 15/092,029

(22) Filed: Apr. 6, 2016

(65) Prior Publication Data

US 2017/0292531 A1  Oct. 12, 2017

(51) Int. Cl.
| | |
|---|---|
| *F02C 7/12* | (2006.01) |
| *F04D 29/54* | (2006.01) |
| *F01D 9/04* | (2006.01) |
| *F02C 7/06* | (2006.01) |
| *F02C 7/14* | (2006.01) |
| *F04D 29/58* | (2006.01) |
| *F28D 21/00* | (2006.01) |

(52) U.S. Cl.
CPC ........... *F04D 29/542* (2013.01); *F01D 9/041* (2013.01); *F02C 7/06* (2013.01); *F02C 7/14* (2013.01); *F04D 29/584* (2013.01); *F05D 2260/213* (2013.01); *F05D 2260/22141* (2013.01); *F28D 2021/0021* (2013.01); *F28D 2021/0026* (2013.01); *F28D 2021/0049* (2013.01); *F28F 2260/02* (2013.01); *Y02T 50/672* (2013.01); *Y02T 50/676* (2013.01)

(58) Field of Classification Search
CPC .... F01D 9/041; F02C 7/06; F02C 7/14; F04D 29/542; F04D 29/584; F05D 2260/213; F05D 2260/22141; F28D 2021/0021; F28D 2021/0026; F28D 2021/0049; F28F 2260/02; Y02T 50/672; Y02T 50/676
See application file for complete search history.

(56) References Cited

U.S. PATENT DOCUMENTS

| | | | |
|---|---|---|---|
| 2,778,601 A | 1/1957 | Eckert | |
| 2,883,151 A | 4/1959 | Dolida | |
| 2,977,090 A * | 3/1961 | McCarty | F01D 5/18 236/88 |

(Continued)

OTHER PUBLICATIONS

Parker Aerospace, "Thermal Management Systems—Higher heat removal and better survivability in aerospace and defense environments", 2011, 4 pages.

(Continued)

*Primary Examiner* — Jesse S Bogue
(74) *Attorney, Agent, or Firm* — Barnes & Thornburg LLP (57) ABSTRACT

A fan module for a gas turbine engine is disclosed herein. The fan module includes a fan, a plurality of outlet guide vanes, and a fluid cooling system. The fan is adapted to rotate about a central axis to pass air at least in part aftward along the central axis and around an engine core of the gas turbine engine. The outlet guide vanes are spaced aft of the fan along the central axis and configured to receive the air passed aftward along the central axis by the fan. The fluid cooling system is configured to transfer heat from a fluid to the air from the fan to cool the fluid.

20 Claims, 5 Drawing Sheets

(56) References Cited

U.S. PATENT DOCUMENTS

| | | | |
|---|---|---|---|
| 3,756,020 A | 9/1973 | Stappenbeck et al. | |
| 4,190,398 A | 2/1980 | Corsmeier et al. | |
| 5,122,033 A | 6/1992 | Marius | |
| 5,151,012 A | 9/1992 | Hough | |
| 6,464,461 B2 | 10/2002 | Wilson et al. | |
| 6,517,312 B1 | 2/2003 | Jones et al. | |
| 6,554,570 B2 | 4/2003 | Dailey | |
| 6,565,312 B1 | 5/2003 | Horn et al. | |
| 6,709,230 B2 * | 3/2004 | Morrison | F01D 5/189 |
| | | | 415/115 |
| 6,735,956 B2 | 5/2004 | Romani | |
| 6,988,367 B2 | 1/2006 | Thompson Jr. et al. | |
| 7,189,064 B2 * | 3/2007 | Helder | B23K 20/122 |
| | | | 416/232 |
| 7,217,088 B2 * | 5/2007 | Albrecht | F01D 5/18 |
| | | | 415/115 |
| 7,377,098 B2 * | 5/2008 | Walker | F01D 9/065 |
| | | | 184/6.11 |
| 8,333,552 B2 | 12/2012 | Wood et al. | |
| 8,616,834 B2 * | 12/2013 | Knight, III | F01D 5/18 |
| | | | 415/116 |
| 2012/0243970 A1 | 9/2012 | Hellgren et al. | |
| 2014/0060002 A1 | 3/2014 | Sonwane et al. | |
| 2015/0315923 A1 * | 11/2015 | Bordoni | F01D 9/04 |
| | | | 415/175 |

OTHER PUBLICATIONS

Parker, "Redifining Spray Technology—Macrospray Single-Point Nozzles Macrospray Spider Nozzles", 2010, 8 pages.

\* cited by examiner

FLUID COOLING SYSTEM INTEGRATED WITH OUTLET GUIDE VANE

FIELD OF THE DISCLOSURE

The present disclosure relates generally to gas turbine engines, and more specifically to gas turbine engines including fluid cooling systems.

BACKGROUND

Oil and other fluids may be used to minimize wear of moving components of gas turbine engines. During use of the gas turbine engines, temperature increases may impact performance of the fluids and, thus, performance of those components. To increase engine performance and service life, fluid cooling systems may be used to cool fluids heated during operation of the gas turbine engines. Current fluid cooling systems suffer from a number of drawbacks.

SUMMARY

The present disclosure may comprise one or more of the following features and combinations thereof.

According to one aspect of the present disclosure, a fan module for a gas turbine engine may include a fan, a plurality of outlet guide vanes, and a fluid cooling system. The fan may be adapted to rotate about a central axis to pass air at least in part aftward along the central axis and around an engine core of the gas turbine engine. The plurality of outlet guide vanes may be spaced aft of the fan along the central axis and configured to receive the air passed aftward along the central axis by the fan. The fluid cooling system may be integral with at least one of the plurality of outlet guide vanes and configured to transfer heat from a fluid to the air from the fan to cool the fluid. The fluid cooling system may include a plurality of cooling passages radially spaced from one another along the at least one outlet guide vane. The cooling passages may extend parallel to one another along the central axis such that when fluid is conducted by the cooling passages during operation of the fan module, the cooling passages cooperate to control a pressure drop of the fluid as the fluid flows through the cooling passages to facilitate heat transfer from the fluid to the air from the fan.

In some embodiments, the cooling passages may have a height and a width of about or less than 0.02 inches. Additionally, in some embodiments, each of the cooling passages may have an aft portion located a first radial distance from the central axis and a forward portion positioned forward of the aft portion along the central axis and located a second radial distance from the central axis substantially equal to the first radial distance, and the cooling passages may extend generally parallel to and along the central axis between the aft portions and the forward portions substantially without extending in a radial direction.

In some embodiments, the at least one outlet guide vane may include a spar defining a supply duct configured to distribute fluid to the cooling passages and a discharge duct configured to collect fluid that has passed through the cooling passages. The supply duct may be formed to include a plurality of supply ports fluidly coupled to the aft portions of the cooling passages and configured to direct fluid into the aft portions of the cooling passages from the supply duct, and the discharge duct may be formed to include a plurality of discharge ports fluidly coupled to the forward portions of the cooling passages and configured to direct fluid that has passed through the cooling passages into the discharge duct from the forward portions of the cooling passages. The at least one outlet guide vane may further include a skin coupled to the spar such that the skin defines a portion of an exterior of the at least one outlet guide vane and the skin and the spar cooperate to define the cooling passages.

In some embodiments, the skin may be formed to include a plurality of lands configured to engage the spar to resist radial migration of fluid between the cooling passages when the skin is coupled to the spar, and the lands may partially define channels that are configured to partially define the cooling passages when the skin is coupled to the spar. Additionally, in some embodiments, a plurality of fins may be bonded to the skin so that the fins extend into the cooling passages, and the fins may be configured to facilitate heat transfer from the fluid to the air from the fan when fluid flows through the cooling passages in use of the fan module. In some embodiments still, a plurality of fins may be bonded to the spar so that the fins extend into the cooling passages, and the fins may be configured to facilitate heat transfer from the fluid to the air from the fan when fluid flows through the cooling passages in use of the fan module. In some embodiments yet still, a plurality of pin fins may be etched or machined into the skin so that the pin fins extend into the cooling passages, and the pin fins may be configured to facilitate heat transfer from the fluid to the air from the fan when fluid flows through the cooling passages in use of the fan module. Finally, in some embodiments, a plurality of pin fins may be etched or machined into the spar so that the pin fins extend into the cooling passages, and the pin fins may be configured to facilitate heat transfer from the fluid to the air from the fan when fluid flows through the cooling passages in use of the fan module.

According to another aspect of the present disclosure, a gas turbine engine may include an engine core, a fan, a plurality of outlet guide vanes, and a fluid cooling system. The engine core may define a central axis. The fan may be coupled to the engine core to be driven by the engine core to rotate about the central axis to pass air at least in part aftward along the central axis around the engine core. The plurality of outlet guide vanes may be spaced aft of the fan along the central axis and configured to receive the air passed aftward along the central axis by the fan. The fluid cooling system may be integral with at least one of the plurality of outlet guide vanes and configured to transfer heat from a fluid to the air from the fan to cool the fluid. The fluid cooling system may include a supply duct, a discharge duct sized to receive fluid from the supply duct, a plurality of cooling passages extending between the supply duct and the discharge duct and configured to conduct fluid provided by the supply duct to transfer heat from the fluid to the air from the fan to cool the fluid during a warm operating condition of the gas turbine engine, and a back pressure regulator configured to fluidly couple the supply duct to the discharge duct during a cold operating condition of the gas turbine engine to conduct fluid directly from the supply duct to the discharge duct during the cold operating condition.

In some embodiments, the back pressure regulator may be configured to fluidly couple the supply duct to the discharge duct during the cold operating condition of the gas turbine engine to conduct fluid directly from the supply duct to the discharge duct when a difference in fluid pressure between the supply duct and the discharge duct is above a threshold pressure. The back pressure regulator may be configured to at least partially block fluid from being conducted directly from the supply duct to the discharge duct during the warm operating condition of the gas turbine engine.

In some embodiments, each of the cooling passages may have an aft portion fluidly coupled to the supply duct and located a first radial distance from the central axis and a forward portion fluidly coupled to the discharge duct, positioned forward of the aft portion along the central axis, and located a second radial distance from the central axis substantially equal to the first radial distance, and the cooling passages may extend along the central axis between the aft portions and the forward portions substantially without extending in a radial direction such that when fluid is conducted by the cooling passages away from the aft portions to the forward portions during the warm operating condition of the gas turbine engine, the cooling passages cooperate to control a pressure drop of the fluid as the fluid flows through the cooling passages to facilitate heat transfer from the fluid to the air from the fan. Additionally, in some embodiments, the supply duct and the discharge duct may be defined by a spar included in the at least one outlet guide vane and the cooling passages may be cooperatively defined by the spar and a plurality of channels formed in a skin that is coupled to the spar. A plurality of fins may be bonded to one or more of the skin and the spar so that the fins extend into the cooling passages, and the fins may be configured to facilitate heat transfer from the fluid to the air from the fan when fluid flows through the cooling passages during the warm operating condition of the gas turbine engine.

According to yet another aspect of the present disclosure, a fan module for a gas turbine engine may include a fan, a plurality of outlet guide vanes, and a fluid cooling system. The fan may be adapted to rotate about a central axis to pass air at least in part aftward along the central axis and around an engine core of the gas turbine engine. The plurality of outlet guide vanes may be spaced aft of the fan along the central axis and configured to receive the air passed aftward along the central axis by the fan. The fluid cooling system may be integral with at least one of the plurality of outlet guide vanes and configured to transfer heat from a fluid to the air from the fan to cool the fluid. The fluid cooling system may include a supply duct having a plurality of supply ports, a discharge duct having a plurality of discharge ports, and a plurality of cooling passages radially spaced from one another and extending between the supply ports and the discharge ports parallel to one another. The cooling passages may each have a height and width of about or less than 0.02 inches.

In some embodiments, each of the cooling passages may extend between a first supply port and a first discharge port over the shortest arcuate path measured between the first supply port and the first discharge port along an exterior-most surface of the at least one outlet guide vane. Additionally, in some embodiments, the supply duct and the discharge duct may be defined by a spar included in the at least one outlet guide vane, and the cooling passages may be cooperatively defined by the spar and a plurality of channels formed in a skin that is coupled to the spar.

These and other features of the present disclosure will become more apparent from the following description of the illustrative embodiments.

DETAILED DESCRIPTION OF THE DRAWINGS

Figure 1:
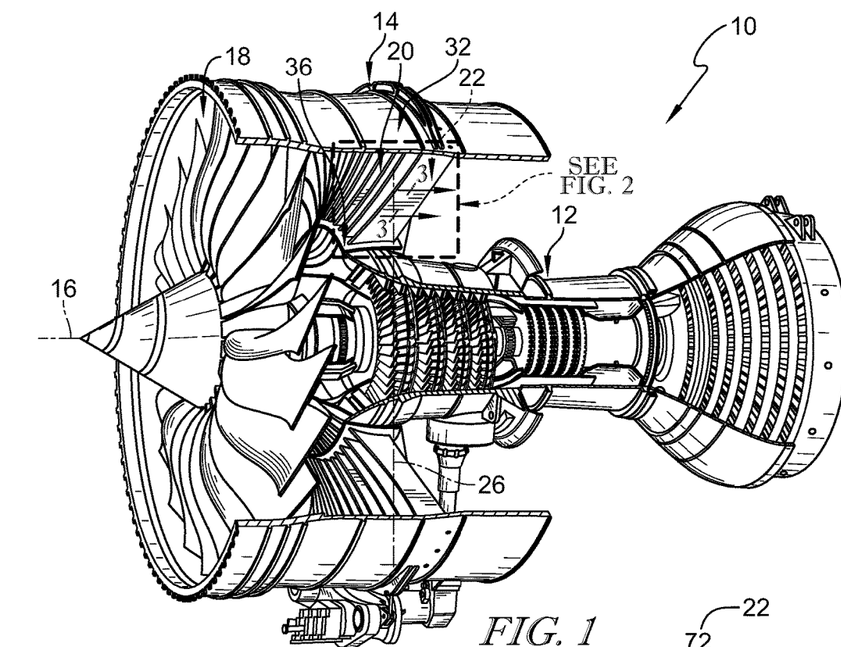
FIG. 1 is a cutaway perspective view of a gas turbine engine including an engine core defining a central axis and a fan module having a fan coupled to the engine core to be driven by the engine core to rotate about the central axis, outlet guide vanes spaced aft of the fan along the central axis, and a lubricant cooling system integral with at least one of the outlet guide vanes, the lubricant cooling system being configured to transfer heat from a lubricant used in the gas turbine engine to air passed over the at least one guide vane to cool the lubricant during operation of the gas turbine engine.

Referring now to FIG. 1, an illustrative gas turbine engine 10 adapted for use in an aircraft is shown. The gas turbine engine 10 includes an engine core 12 and a fan module 14. The engine core 12 is configured to pass air therethrough, which may be pressurized in some embodiments, so that the air flows aftward along a central axis 16 defined by the engine core 12. The fan module 14 includes a rotor coupled to the engine core 12 to be driven by the engine core 12 to rotate about the axis 16 to pass air at least in part aftward along the axis 16 around the engine core 12.

Figure 2:
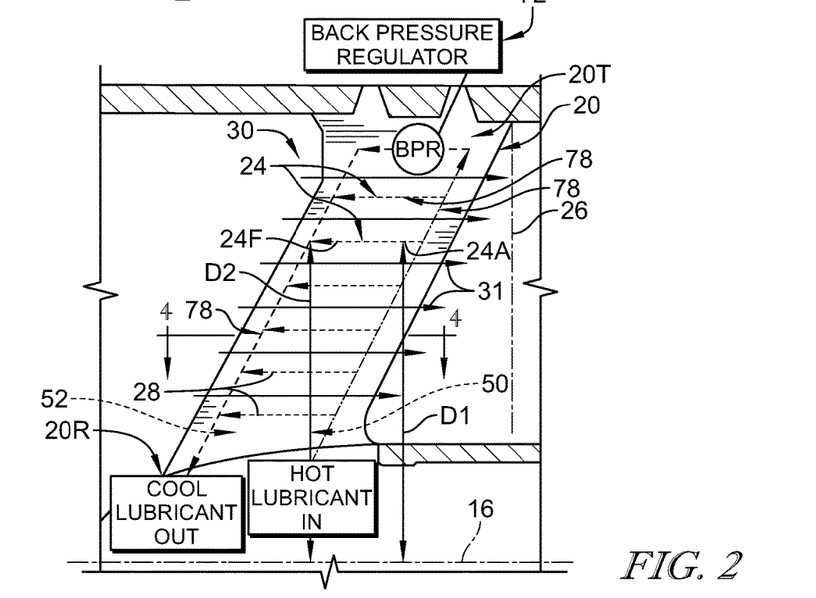
FIG. 2 is a detail view of the at least one outlet guide vane of FIG. 1, with certain features depicted diagrammatically, showing that the lubricant cooling system includes cooling passages extending aftward along the central axis defined by the engine core substantially without extending in a radial direction and that lubricant is conducted by the cooling passages to transfer heat from the lubricant to the air to cool the lubricant during a warm operating condition of the gas turbine engine in which the lubricant is relatively warm.

The fan module 14 illustratively includes a fan 18, outlet guide vanes 20, and a lubricant cooling system 22 as shown in FIGS. 1 and 2. The fan 18 is coupled to the engine core 12 and driven by the engine core 12 to rotate about the central axis 16. The outlet guide vanes 20 are spaced aft of the fan 18 along the axis 16 and configured to receive the air passed aftward along the axis 16 and around the engine core 12 by the fan 18, which may be referred to herein as bypass air. The lubricant cooling system 22 is configured to transfer heat from a lubricant (e.g., oil) used in the gas turbine engine 10 to the bypass air to cool the lubricant during operation of the engine 10. Lubricant cooling may minimize wear of components of the engine 10 that require lubrication during use thereof, thereby improving the performance of those components and the engine 10.

In the illustrative embodiment, the lubricant cooling system 22 is integral with at least one of the outlet guide vanes 20 as shown in FIGS. 1 and 2. The lubricant cooling system 22 is described below with reference to only one of the outlet guide vanes 20. However, that description is equally applicable to each of multiple outlet guide vanes 20 or to a subset of the outlet guide vanes 20 that may include the lubricant cooling system 22.

Referring now to FIG. 2, the lubricant cooling system 22 illustratively includes cooling passages 24 spaced from one another along a radial axis 26 that is generally perpendicular to the central axis 16. Each of the cooling passages 24 has an aft portion 24A located a radial distance D1 from the central axis 16 and a forward portion 24F positioned forward of the aft portion 24A along the axis 16 and located a radial distance D2 from the axis 16. The radial distances D1, D2 are substantially equal to one another. The cooling passages 24 extend generally parallel to and along the central axis 16 between the aft and forward portions 24A, 24F substantially without extending along the radial axis 26.

The cooling passages 24 are each configured to conduct lubricant forward along the central axis 16 away from the aft portions 24A to the forward portions 24F as indicated by arrows 28 during an operating condition 30 of the gas turbine engine 10 shown in FIG. 2. The illustrative size and arrangement of the cooling passages 24 controls a pressure drop of the lubricant as the lubricant flows through the passages 24 as discussed below. As a result, the flow of lubricant facilitates heat transfer from the lubricant to the bypass air when bypass air indicated by arrows 31 flows over the outlet guide vane 20 and lubricant is conducted through the cooling passages 24.

Figure 8:
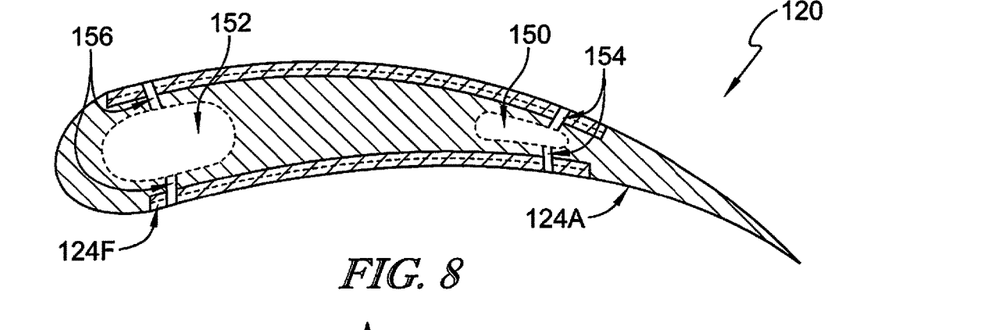
FIG. 8 is a cross-sectional view of another outlet guide vane adapted for use in the fan module of FIG. 1 and a lubricant cooling system integral with the another outlet guide vane.
Figure 9:
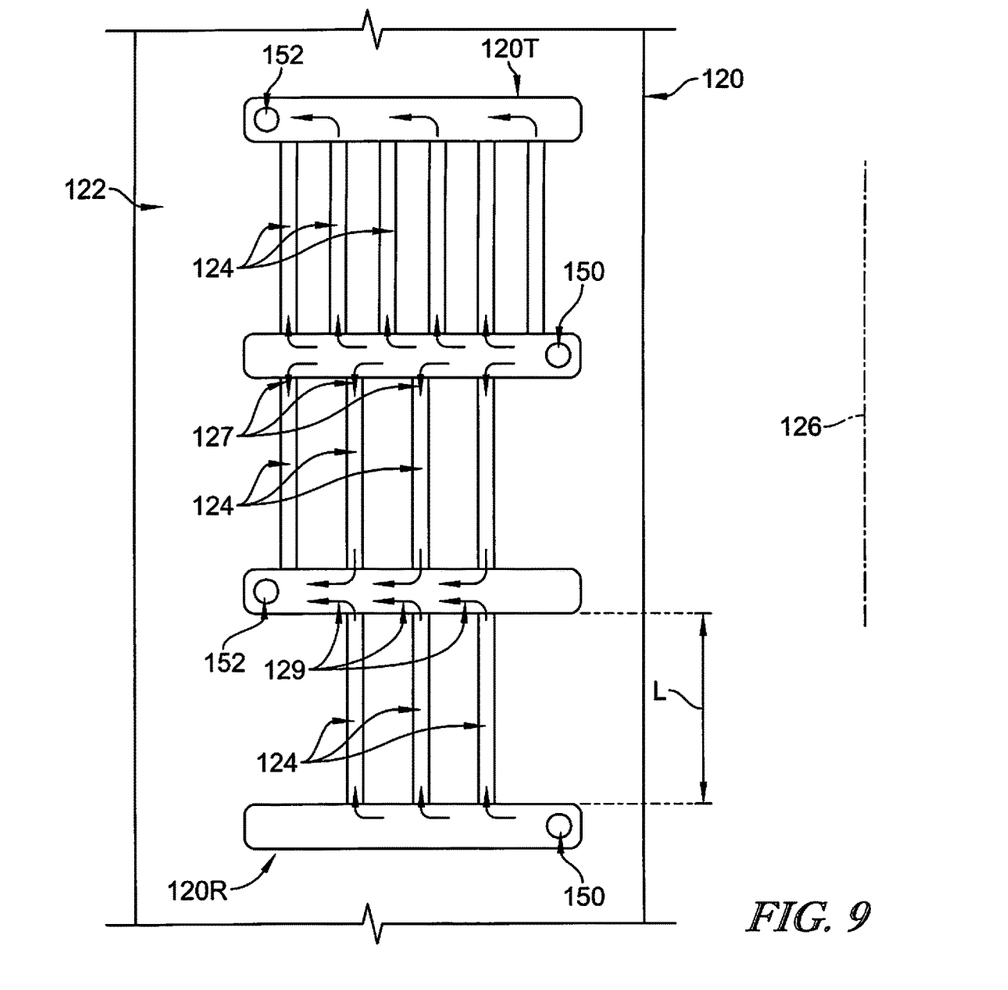
FIG. 9 is a diagrammatic view of the lubricant cooling system of the another outlet guide vane of FIG. 8 showing that the lubricant cooling system includes cooling passages extending in a radial direction and configured to conduct lubricant therethrough to transfer heat from the lubricant to air passed over the another guide vane to cool the lubricant.

In other embodiments, cooling passages 124 included in a lubricant cooling system 122 may extend along a radial axis 126 as shown in FIGS. 8 and 9. In such embodiments, each of the passages 124 may have a length L that is between about 4 inches and 16 inches. Additionally, in such embodiments, the passages 124 may be configured to conduct lubricant away from the a tip 120T of an outlet guide vane 120 toward a root 120R of the outlet guide vane 120 along the axis 126 as indicated by arrows 127, and also away from the root 120R toward the tip 120T along the axis 126 as indicated by arrows 129. In other embodiments still, the cooling passages 24 may extend between the portions 24A, 24F such that the passages 24 zig-zag back and forth along the radial axis 26.

In other embodiments, the cooling passages 24 may each be configured to conduct lubricant aftward along the central axis 16 away from the forward portions 24F to the aft portions 24A. In those embodiments, the cooling passages 24 may extend generally parallel to and along the central axis 16 between the forward and aft portions 24F, 24A substantially without extending along the radial axis 26. However, in those embodiments, the cooling passages 24 may extend between the forward and aft portions 24F, 24A along the radial axis 26.

In the illustrative embodiment, the cooling passages 24 are micro-passages having a relatively small size as discussed below that are formed in the outlet guide vane 20 between a root 20R and a tip 20T of the vane 20 as shown in FIG. 2. Specifically, in the illustrative embodiment, the passages 24 are formed at or near the root 20R.

In other embodiments, however, the cooling passages may be formed in another suitable location of the outlet guide vane 20. For example, the passages may be formed at or near the tip 20T, or at least closer to the tip 20T than the root 20R. In such embodiments, lubricant may be supplied to and discharged from the passages at or near the tip 20T.

In other embodiments, however, the cooling passages 24 may be formed in another suitable location other than the outlet guide vane 20. In one example, the cooling passages 24 may be formed in an outer shroud 32 surrounding the tip 20T. In another example, the cooling passages 24 may be formed in an inner ring 36 coupled to the root 20R or in a location surrounding the tip 20T. In yet another example, the cooling passages 24 may be formed in a location forward of the outlet guide vane 20 and the fan 18 along the central axis 16, such as an inlet region of the engine 10.

Figure 4:
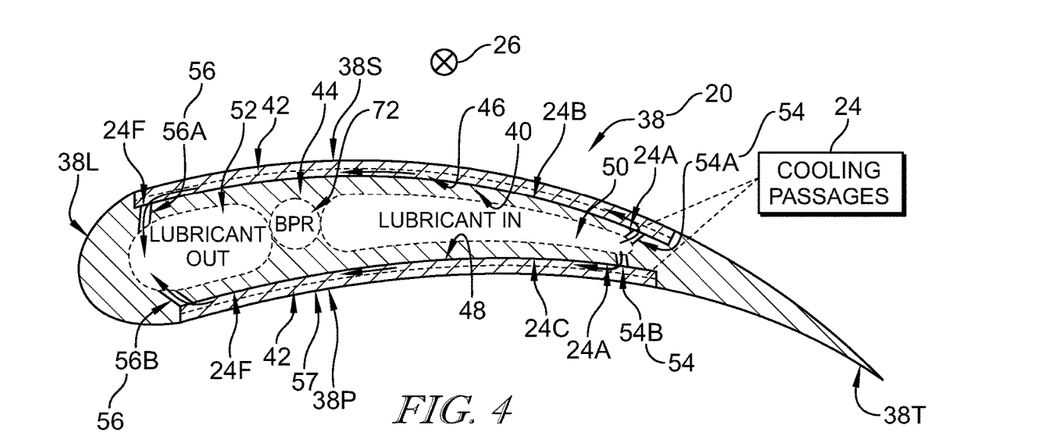
FIG. 4 is another sectional view of the at least one outlet guide vane taken along line 4-4 of FIG. 2, with certain features depicted diagrammatically, showing that the spar is formed to include a lubricant supply duct having supply ports configured to conduct lubricant to the cooling passages and a lubricant discharge duct having discharge ports configured to conduct lubricant discharged from the cooling passages and showing that a back pressure regulator interconnects the supply duct to the discharge duct to allow flow directly from the supply duct to the discharge duct when the lubricant is relatively cool.
Figure 5:
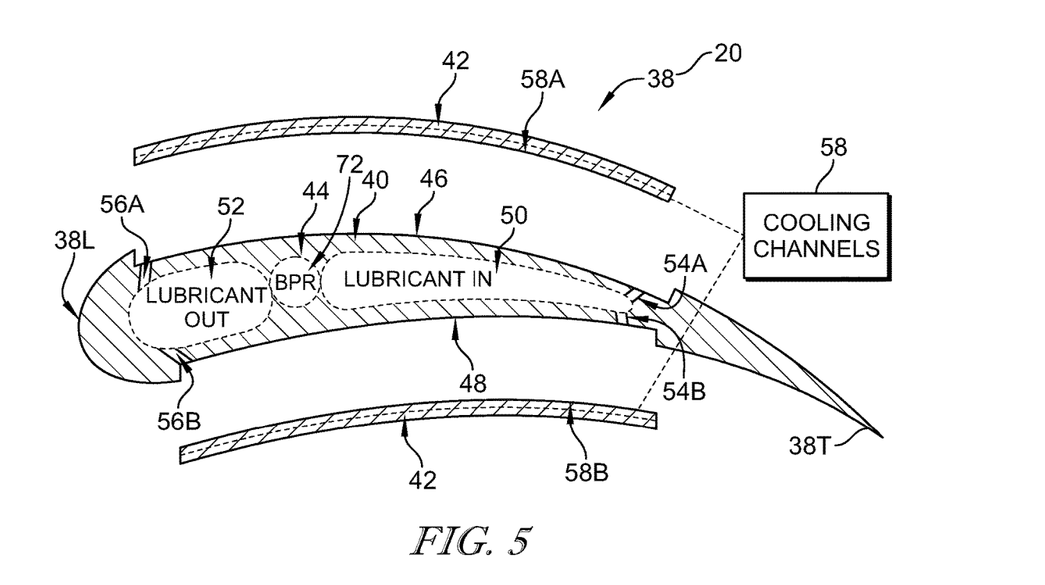
FIG. 5 is an assembly view of the at least one outlet guide vane of FIG. 4 showing the skin removed from the spar, that the skin is configured to couple to the spar between a leading edge and a trailing edge of the airfoil, and that the skin defines part of a pressure side and a suction side of the airfoil.

Referring now to FIGS. 4 and 5, an illustrative airfoil 38 included in the outlet guide vane 20 is shown in greater detail. The airfoil 38 includes a spar 40 and a skin 42 coupled to the spar 40. The spar 40 extends from a leading edge 38L to a trailing edge 38T of the airfoil 38 and defines a core region 44 of the airfoil 38. The skin 42 is coupled to exterior portions 46, 48 of the spar 40 located between the leading and trailing edges 38L, 38T and positioned exteriorly of the core region 44. The skin 42 defines part of respective pressure and suction sides 38P, 38S of the airfoil 38.

The spar 40 of the outlet guide vane 20 illustratively defines a lubricant supply duct 50 and a lubricant discharge duct 52 as shown in FIGS. 4 and 5. The lubricant supply duct 50 is configured to distribute pressurized lubricant provided by a source of pressurized lubricant to the aft portions 24A of the cooling passages 24 during the operating condition 30. The lubricant discharge duct 52 is configured to collect pressurized lubricant that has passed through the passages 24 from the aft portions 24A to the forward portions 24F during the operating condition 30. The lubricant supply duct 50 is located aft of the lubricant discharge duct 52 along the central axis 16. As described herein, the lubricant cooling system 22 includes the lubricant supply duct 50 and the lubricant discharge duct 52.

The lubricant supply duct 50 illustratively includes supply ports 54A, 54B that fluidly couple the duct 50 to the respective exterior portions 46, 48 of the spar 40 as shown in FIGS. 4 and 5. The lubricant discharge duct 52 illustratively includes discharge ports 56A, 56B that fluidly couple the duct 52 to the respective exterior portions 46, 48 of the spar 40.

The skin 42 is illustratively formed to include channels 58A, 58B as shown in FIGS. 4 and 5. When the skin 42 is coupled to the exterior portions 46, 48 as shown in FIG. 5, the channels 58A, 58B and the respective exterior portions 46, 48 cooperate to define respective cooling passages 24B, 24C. The aft portion 24A of the cooling passage 24B is fluidly coupled to the lubricant supply duct 50 by the supply port 54A and the forward portion 24F of the passage 24B is fluidly coupled to the lubricant discharge duct 52 by the discharge port 56A. The aft portion 24A of the cooling passage 24C is fluidly coupled to the duct 50 by the supply port 54B and the forward portion 24F of the passage 24C is fluidly coupled to the duct 52 by the discharge port 56B.

Each of the cooling passages 24 extends between one of the supply ports 54 and one of the discharge ports 56 along an arcuate path as shown in FIG. 4. Specifically, using the passage 24C as an example, the passage 24C extends between the supply port 54B and the discharge port 56B along an arcuate path 57. The arcuate path 57 represents the shortest arcuate path measured between the supply port 54B and the discharge port 56B along the pressure side 38P of the airfoil 38. Put another way, because the portions 24A, 24F are located at substantially equal radial distances D1, D2 from the axis 16, and because the arcuate path 57 mimics the curvature of the pressure side 38P between the portions 24A, 24F, the path 57 represents the shortest path measured between the ports 54B, 56B along the side 38P.

Referring now to FIGS. 3A-3D, the illustrative interaction between the spar 40 and the skin 42 is shown in greater detail. The skin 42 includes a body 60 and ribs or lands 62 that extend outwardly away from the body 60 to engage the exterior portion 48 of the spar 40. The channels 58 are defined by the body 60 and adjacent lands 62 and the cooling passages 24 are defined by the channels 58 and the exterior portion 48.

In the illustrative embodiment, the cooling passages 24 have a substantially rectangular shape as shown in FIGS. 3A-3D. In other embodiments, however, the cooling passages 24 may take the shape of other suitable geometric forms.

Additionally, in the illustrative embodiment, the cooling passages 24, when fins 64-70 are not disposed therein as discussed below, have a height H1 and a width W1 of about or less than 0.02 inches. In other embodiments, however, the cooling passages 24 may have another height and width suited to facilitate heat transfer from the lubricant to the bypass air when bypass air flows over the outlet guide vane 20 and lubricant is conducted through the cooling passages 24.

In the illustrative embodiment, heat transfer from the lubricant to the bypass air as the lubricant flows through the cooling passages 24 and the bypass air flows over the outlet guide vane 20 takes place primarily along the height H1 and the width W1 of each passage 24. As such, minimal, if any, heat is transferred from the lubricant to the bypass air when the lubricant is contained in the lubricant supply duct 50 or in the lubricant discharge duct 52.

In the illustrative embodiment, the spar 40 and the skin 42 have a metallic construction as shown in FIGS. 3A-3D. In one example, one or more of the spar 40 and the skin 42 may be constructed of aluminum or titanium. In other embodiments, however, the spar 40 and the skin 42 may have other suitable constructions. For instance, in those embodiments, one or more of the spar 40 and the skin 42 may be constructed of ceramic materials, composite materials, or other non-metallic materials.

In the illustrative embodiment, the channels 58 are formed in the skin 42 by an etching technique. In one example, the channels 58 may be formed in the skin 42 by a chemical etching technique. In other embodiments, however, the channels 58 may be formed in the skin 42 by another suitable technique. For instance, in those embodiments, the channels 58 may be formed in the skin 42 by an Electrical Discharge Machining (EDM) technique or a Computer Numerical Control (CNC) machining technique.

The skin 42 may be coupled to the spar 40 in a number of ways. In one example, the skin 42 may be diffusion bonded to the spar 40. In another example, the skin 42 may be brazed to the spar 40 so that the braze material does not substantially block the flow of lubricant through the cooling passages 24.

In some embodiments, rather than being formed in the skin 42, the channels may instead be formed in the spar 40 (e.g., the exterior portions 46, 48). In one example, the channels may be formed in the spar 40 by an etching technique such as a chemical etching technique. In another example, the channels may be formed in the spar 40 by an Additive Layer Manufacturing (ALM) technique. In yet another example, the channels may be formed in the spar 40 by an EDM or CNC machining technique.

In embodiments where the channels are formed in the spar 40, fins 64-70 may be bonded with the spar 40 or etched/machined into the spar 40. In such embodiments, the lands may be provided by the spar 40, and the skin 42 may be embodied as a thin, rectangular metallic sheet that is configured to engage the lands to close off the channels and thereby define the cooling passages.

Figure 3A:
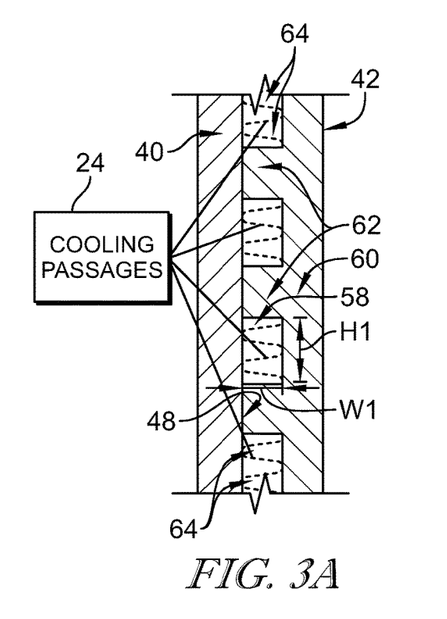
FIG. 3A is a sectional view of the at least one outlet guide vane taken along line 3-3 of FIG. 1 showing that the guide vane includes an airfoil having a spar and a skin coupled to the spar, the spar cooperates with channels formed in the skin to define the cooling passages, and the skin may be formed to include fins that extend into the cooling passages.

In some embodiments, fins 64 may be bonded to the skin 42 so that the fins 64 extend into the cooling passages 24 as shown in FIG. 3A. The fins 64 may provide additional surface area over which heat may be transferred from the lubricant to the bypass air when lubricant flows through the cooling passages 24 over the fins 64 and bypass air flows over the outlet guide vane 20. As such, the fins 64 may be configured to facilitate heat transfer from the lubricant to the bypass air when lubricant flows through the cooling passages 24 in use of the gas turbine engine 10. In such embodiments, to enable the skin 42 to flex to match the curvature of the exterior portions 46, 48 of the spar 40 in use of the engine 10, slots may be formed along the length of the fins 64. Additionally, in such embodiments, the lands 62 of the skin 42 may be bonded to the spar 40 to inhibit radial migration of the lubricant between the passages 24.

Figure 3B:
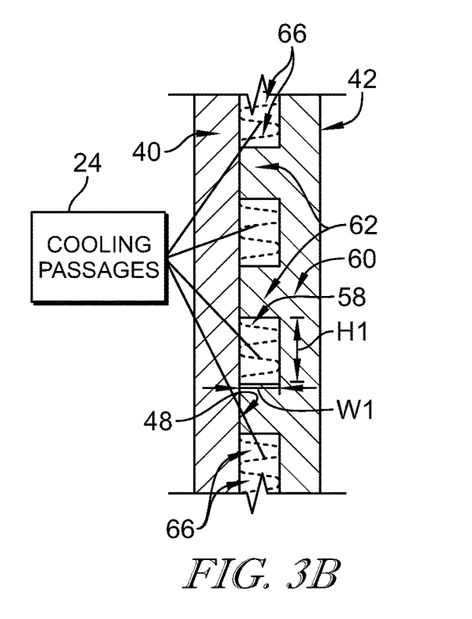
FIG. 3B is another sectional view of the outlet guide vane similar to FIG. 3A showing that the spar may be formed to include fins that extend into the cooling passages.

In some embodiments, fins 66 may be bonded to the spar 40 (e.g., the exterior portions 46, 48) so that the fins 66 extend into the cooling passages 24 as shown in FIG. 3B. The fins 66 may provide additional surface area over which heat may be transferred from the lubricant to the bypass air when lubricant flows through the cooling passages 24 over the fins 66 and bypass air flows over the outlet guide vane 20. As such, the fins 66 may be configured to facilitate heat transfer from the lubricant to the bypass air when lubricant flows through the cooling passages 24 in use of the gas turbine engine 10. In such embodiments, to enable the fins 66 to flex to match the curvature of the spar 40 in use of the engine 10, slots may be formed along the length of the fins 66. Additionally, in such embodiments, the fins 66 may be bonded to the body 60 of the skin 42 to facilitate heat transfer from the lubricant to the fins 66, from the fins 66 to the body 60, and from the body 60 to the bypass air passing over the outlet guide vane 20.

Figure 3C:
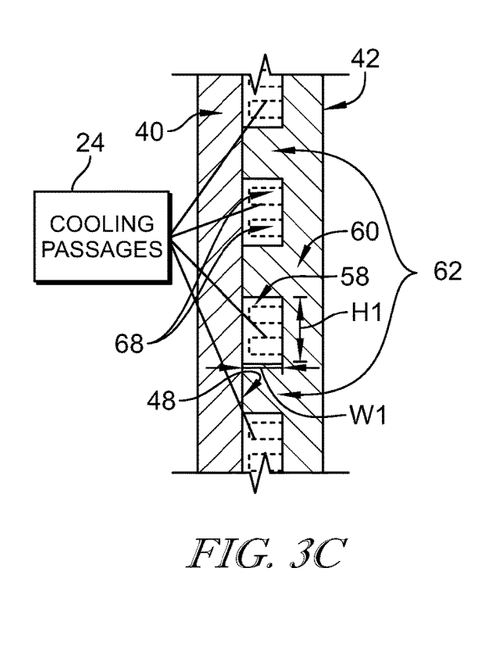
FIG. 3C is a yet another sectional view of the outlet guide vane similar to FIG. 3A showing that the skin may be formed to include pin fins that extend into the cooling passages.

In some embodiments, pin fins 68 may be bonded to the skin 42 or etched/machined into the skin 42 so that the pin fins 68 extend into the cooling passages 24 as shown in FIG. 3C. The pin fins 68 may provide additional surface area over which heat may be transferred from the lubricant to the bypass air when lubricant flows through the cooling passages 24 over the pin fins 68 and bypass air flows over the outlet guide vane 20. As such, the pin fins 68 may be configured to facilitate heat transfer from the lubricant to the bypass air when lubricant flows through the cooling passages 24 in use of the gas turbine engine 10. Additionally, the pin fins 68 may facilitate flexing of the skin 42 to match the curvature of the exterior portions 46, 48 of the spar 40 in use of the engine 10. In such embodiments, the lands 62 of the skin 42 may be bonded to the spar 40 to inhibit radial migration of the lubricant between the passages 24. Additionally, in such embodiments, the pin fins 68 may facilitate heat transfer from the lubricant to the bypass air and flexing of the skin 42 to match the curvature of the spar 40 to a greater degree than the fins 64, 66.

Figure 3D:
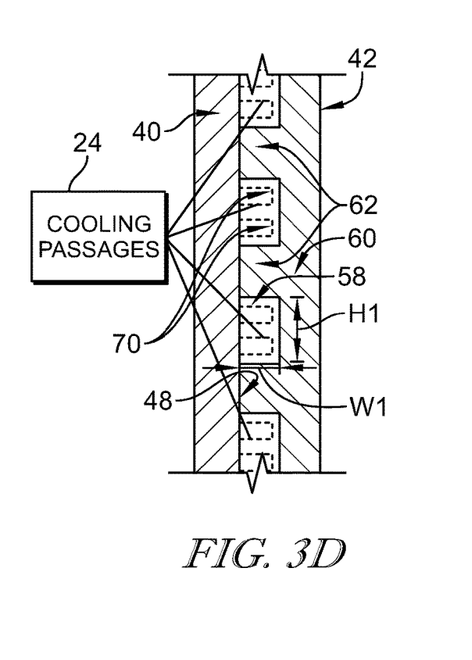
FIG. 3D is a yet another sectional view still of the outlet guide vane similar to FIG. 3A showing that the spar may be formed to include pin fins that extend into the cooling passages.

In some embodiments, pin fins 70 may be bonded to the spar 40 or etched/machined into the spar 40 so that the pin fins 70 extend into the cooling passages 24 as shown in FIG. 3D. The pin fins 70 may provide additional surface area over which heat may be transferred from the lubricant to the bypass air when lubricant flows through the cooling passages 24 over the pin fins 70 and bypass air flows over the outlet guide vane 20. As such, the pin fins 70 may be configured to facilitate heat transfer from the lubricant to the bypass air when lubricant flows through the cooling passages 24 in use of the gas turbine engine 10. In such embodiments, the lands 62 of the skin 42 may be bonded to the spar 40 to inhibit radial migration of the lubricant between the passages 24. Additionally, in such embodiments, the pin fins 70 may facilitate heat transfer from the lubricant to the bypass air. Finally, in such embodiments, the pin fins 70 may be bonded to the spar 40 and the skin 42.

In embodiments where the fins 64-70 are disposed in the cooling passages 24, the height H1 and the width W1 of each passage 24 may be different from one another and the corresponding height H1 and W1 of the passages 24 that lack fins 64-70. For example, in embodiments where the fins 64-70 are disposed in the cooling passages 24, the height H1 of the cooling passages 24 may be greater than 0.1 inches. In those embodiments, the radial distance between the fins 64-70 within the passages 24 may be substantially less than 0.1 inches.

Figures 6, 7:
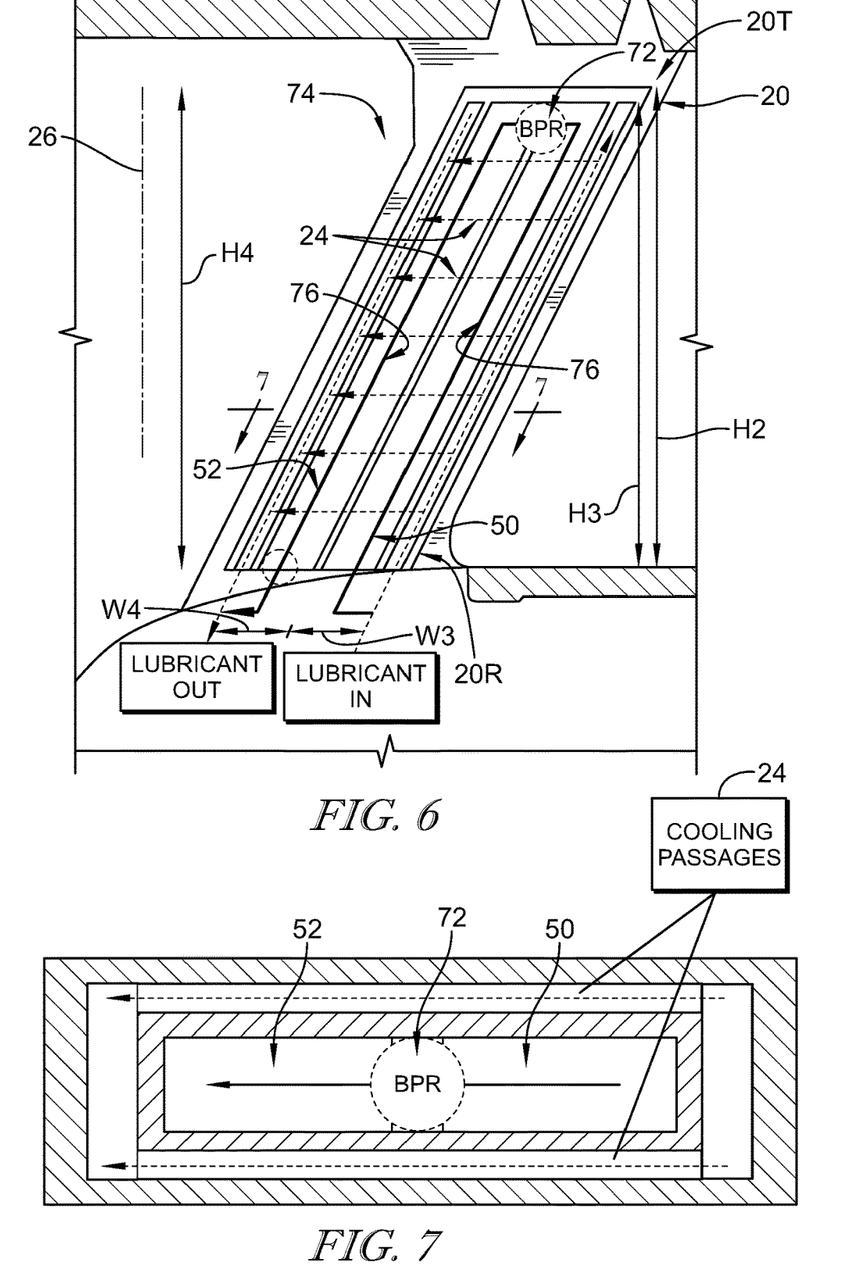
FIG. 6 is a partially diagrammatic view of the at least one guide vane of FIG. 1 showing that the lubricant cooling system includes the back pressure regulator fluidly coupled between the lubricant supply duct and the lubricant discharge duct that is configured to fluidly couple the lubricant supply duct to the lubricant discharge duct to conduct lubricant directly from the lubricant supply duct to the lubricant discharge duct without passing through the cooling passages and to regulate a difference in lubricant pressure between the lubricant supply duct and the lubricant discharge duct.
FIG. 7 is a partially diagrammatic cross-sectional view of the at least one outlet guide vane taken along line 7-7 of FIG. 6 showing lubricant flow paths through the outlet guide vane during the warm operating condition and during a cold operating condition of the gas turbine engine in which the lubricant is relatively cool.

Referring now to FIGS. 6 and 7, the lubricant supply duct 50 and the lubricant discharge duct 52 illustratively extend over substantially all of the height H2 of the outlet guide vane 20 measured along the radial axis 26. The duct 50 has a height H3 and a width W3 that are greater than the height H1 and the width W1, respectively, of the cooling passages 24. The duct 52 has a height H4 and a width W4 that are greater than the height H1 and the width W1, respectively, of the cooling passages 24.

The lubricant cooling system 22 illustratively includes a back pressure regulator (BPR) 72 as shown in FIGS. 6 and 7. The back pressure regulator 72 is fluidly coupled between the lubricant supply duct 50 and the lubricant discharge duct 52. During an operating condition 74 of the gas turbine engine 10 shown in FIG. 6, the back pressure regulator 72 is configured to permit lubricant to be conducted directly from the lubricant supply duct 50 to the lubricant discharge duct 52 without first passing through the cooling passages 24. Additionally, during the operation condition 30 of the engine 10 shown in FIG. 2, the back pressure regulator 72 is configured to at least partially block lubricant from being conducted directly from the duct 50 to the duct 52.

In some embodiments, during the operating condition 74, the back pressure regulator 72 may be configured to fluidly couple the lubricant supply duct 50 to the lubricant discharge duct 52 to conduct lubricant directly from the duct 50 to the duct 52 when a difference in lubricant pressure between the duct 50 and the duct 52 is above a threshold pressure. In other embodiments, a pressure relief valve may be used in lieu of the back pressure regulator 72.

Referring now to FIGS. 2 and 6, the operating conditions 30, 74 of the gas turbine engine 10 will be described in detail. The operating condition 30 illustratively corresponds to normal operation of the engine 10, whereas the operating condition 74 illustratively occurs during the start-up of the engine 10.

During the operating condition 30 corresponding to normal operation shown in FIG. 2, the temperature of the lubricant is generally high enough that lubricant can easily flow through the cooling passages 24. Because of the relatively high temperature of the lubricant during the operating condition 30, the operating condition 30 may be referred to herein as a warm operating condition of the engine 10.

During the operating condition 74 corresponding to start-up shown in FIG. 6, the temperature of the lubricant may be low enough that, due to the viscosity of the lubricant at the low temperature and the size of the passages 24, the pressure drop of the lubricant as the lubricant flows through the passages 24 becomes excessive. The excessive pressure drop may cause damage to the outlet guide vane 20 and inhibit the flow of lubricant to the components of the engine 10 requiring lubrication. Because of the relatively low temperature of the lubricant during the operating condition 74, the operating condition 74 may be referred to herein as a cold operating condition of the engine 10.

Lubricant is illustratively conducted along a flow path 76 during the cold operating condition 74 as shown in FIG. 6. Specifically, lubricant is conducted along the flow path 76 through the supply duct 50 to the back pressure regulator 72, through the back pressure regulator 72 to the discharge duct 52, and through the discharge duct 52 during the condition 74. Lubricant discharged from the discharge duct 52 during the condition 74 may be conducted to one or more components of the engine 10 requiring lubrication.

Lubricant conduction along the illustrative flow path 76 shown in FIG. 6 avoids a substantial pressure rise of the pressurized lubricant that might occur were lubricant to be conducted through the cooling passages 24 during the cold operating condition 74. During the condition 74, the viscosity of the lubricant is relatively high compared to a condition in which the viscosity of the lubricant is lower (e.g., the warm operating condition 30). Because the size of the passages 24 substantially limit the relatively high viscosity lubricant from being conducted through the passages 24, routing the relatively high viscosity lubricant to the passages 24 might result in a substantial pressure rise of the pressurized lubricant. Because the lubricant supply duct 50 and the lubricant discharge duct 52 are sized to conduct the relatively high viscosity lubricant therethrough without the substantial pressure rise, conduction of the lubricant along the flow path 76 avoids the substantial pressure rise.

Lubricant flow along the illustrative flow path 76 shown in FIG. 6 may also provide heat to the outlet guide vane 20, and therefore to any relatively high viscosity lubricant residing in the cooling passages 24. As heat is provided to the vane 20 and the lubricant, the temperature of the lubricant increases and the viscosity of the lubricant decreases. Once the temperature of the lubricant increases so that the lubricant can easily flow through the passages 24, the lubricant may be conducted through the cooling passages 24 during the warm operating condition 30 without substantial pressure losses.

Lubricant at a relatively high temperature as indicated by the hot lubricant label is illustratively conducted along a flow path 78 during the warm operating condition 30 as shown in FIG. 2. Specifically, lubricant is conducted along the flow path 78 through the supply ports 54 to the cooling passages 24, through the passages 24 forward along the axis 16 to the discharge ports 56, and through the ports 56 during the condition 30. Lubricant discharged from the duct 52 during the condition 30 may be conducted to one or more components of the engine 10 requiring lubrication.

As the lubricant at the relatively high temperature passes through the cooling passages 24 along the flow path 78, heat from the lubricant is transferred to the bypass air indicated by arrows 31 to cool the lubricant as shown in FIG. 2. Thus, cooled lubricant is conducted through the discharge ports 56 and discharged by the duct 52 as indicated by the cool lubricant out label.

As the lubricant at the relatively high temperature passes through the cooling passages 24 along the flow path 78 as shown in FIG. 2, the difference in lubricant pressure between the lubricant supply duct 50 and the lubricant discharge duct 52 falls below the threshold pressure. When the difference in lubricant pressure between the duct 50 and the duct 52 falls below the threshold pressure, the back pressure regulator 72 at least partially blocks lubricant from being conducted directly from the supply duct 50 to the lubricant discharge duct 52. As a result, during the warm operating condition 30, substantially all of the lubricant provided by the duct 50 is conducted through the cooling passages 24 to be cooled before being discharged by the duct 52.

The orientation of each of the illustrative cooling passages 24 allows the lubricant cooling system 22 to have a greater cooling capability than other configurations while maintaining acceptable pressure losses. Because of the large number of supply and discharge ports 54, 56 that are distributed along the axis 26, many parallel passages 24 may be provided over the radial height of the outlet guide vane 20. The small height H1 of each of the passages 24 also allows more passages 24 to be provided over the radial height of the outlet guide vane 20 than other configurations. The increased number of small passages 24 provides more heat transfer area, and thus greater cooling capacity, than the cooling capacity associated with other configurations having fewer cooling passages and larger flow passages. Additionally, the large number of passages 24 reduces the pressure loss of lubricant flowing through the passages 24.

The illustrative size of the cooling passages 24 controls the pressure drop of the lubricant conducted through the passages 24 during the warm operating condition 30 while providing desired heat transfer when compared to other configurations. In one respect, because the pressure drop of the lubricant tends to increase as the length of the passages 24 increases, the minimal length of the passages 24 in the axial direction minimizes the pressure drop of the lubricant conducted through the passages 24 compared to other configurations. In another respect, because the pressure drop of the lubricant tends to decrease as more passages 24 are provided by the outlet guide vane 20, the relatively high number of passages 24 provided by the vane 20 can reduce the pressure drop of the lubricant conducted through the passages 24 and therefore permit the small passages 24 to be used. In both respects, controlling the pressure drop of the lubricant conducted through the passages 24 during the condition 30 can facilitate heat transfer from the lubricant to the bypass air flowing over the vane 20.

The present disclosure provides outlet guide vanes (e.g., the outlet guide vanes 20) that may be used to cool lubricant (e.g., oil) required by an engine lubrication system. The outlet guide vanes may provide oil cooling passages (e.g., the cooling passages 24) that run aft to forward (e.g., aftward along the central axis 16). The oil cooling passages may decrease thermal resistance by both increasing the heat transfer coefficient at the oil interface and also increasing the heat transfer area.

In some instances, the cooling passages formed in the outlet guide vane may be used with fluids other than oil. For example, the cooling passages may be used with refrigerant or fuel. As such, the term lubricant as used herein may be embodied as, or otherwise include, oil, refrigerant, fuel, or other suitable fluids.

The cooling system (e.g., the lubricant cooling system 22) may provide a number of benefits. In one respect, the cooling system may provide improved cooling capacity compared to other designs. In another respect, the cooling system may be lighter and simpler compared to other designs such as box heat exchangers. In yet another respect, the gas turbine engine (e.g., the engine 10) that includes the cooling system may achieve improved performance compared to other engines. In the last respect, the improved performance may result from lower fan stream (e.g., the bypass stream of the fan 18) pressure losses.

In some instances, the outlet guide vane may be formed by an outlet guide vane core (e.g., the spar 40) and a sheet (e.g., the skin 42) that is bonded to the outlet guide vane core. The sheet may be etched to define oil flow channels (e.g., the channels 58). In other instances, the outlet guide vane core may be etched to define oil flow channels. Depending on fluid flow requirements and manufacturability criteria, various patterns may be etched into the sheet or the outlet guide vane core.

A back pressure regulator (e.g., the back pressure regulator 72) may be needed to bypass the small flow passages when the oil is cold (e.g., during the cold operating condition 74). In some instances, the back pressure regulator may be internal to the outlet guide vane. In other instances, the back pressure regulator may be external to the outlet guide vane.

Fuel flow in some gas turbine engines may be inadequate to act as a heat sink for heat loads produced by engine lubrication systems incorporated into the engines. Surface coolers that may be incorporated into some gas turbine engines to address the heat loads may add pressure losses to the fan stream, thereby reducing the efficiency of the engines. Box-shaped heat exchangers that may be incorporated into some gas turbine engines to address the heat loads may produce pressure losses and/or bleed air from the fan stream.

The present disclosure may utilize existing structures (e.g., the vanes 20) to provide heat transfer surfaces. As such, pressure losses resulting from heat rejection may be minimal, and the addition of new components dedicated to heat rejection may be foregone.

The present disclosure provides oil passages that are integrated into an outlet guide vane. These passages may be sized to increase the heat transfer coefficient and to increase the oil scrubbed heat transfer surface area relative to other designs. The passages may be formed in a support structure (e.g., the shroud 32), or in the inner diameter (e.g., the ring 36) or outer diameter of the fan stream. The passages may also be formed in an inlet region of the engine where the air may be cooler.

The passages may be formed by various manufacturing methods. The oil passages may be sized about or less than 0.02 inches (e.g., the height H1 and W1 of the channels 58). The channels may be chemically etched into the outlet guide vane core and a thin cover sheet may be bonded to the outlet guide vane core to cover the open channels so that the passages are formed. The cover sheet bonding may preferably be done with diffusion bonding. However, the bonding may be done by brazing so long as the braze material doesn't block the passages. The channels may also be etched into the cover sheet rather than the outlet guide vane core. As one alternative to etching, an Additive Layer Manufacturing (ALM) technique may be employed. In this alternative, a coversheet may be used to cover the channels to form the passages.

In other embodiments, a cover sheet may be omitted such that the outlet guide vane and the passages may be formed entirely from the outlet guide vane core. In such embodiments, an ALM technique may be used to form the outlet guide vane and the passages from the outlet guide vane core.

Heat exchanger fins (e.g., the fins 64, 66) may be bonded into a side pocket of the outlet guide vane core or onto the cover sheet. The cover sheet may then be bonded to the outlet guide vane core. The fins may need to be cut periodically along their length to enable flexure of the fin sheet to match the curvature of the outlet guide vane core.

Rather than fins, pins (e.g., the fin pins 68, 70) may be etched into the outlet guide vane core or the coversheet to facilitate flexing of the coversheet. The passages may depart from the straight shape (e.g., the rectangular shape of the passages 24) to increase heat transfer area and break down the thermal boundary layer in the fluid.

A substantial pressure loss of the oil as the oil flows through the passages may be associated with the size of the passages. In the present design, the passages flow aft going forward along the outlet guide vane. The present design may be desirable in that the passages have shorter lengths than would be the case were the passages to run radially over the full length of the outlet guide vane. Due to the axial orientation of the passages, more parallel paths for oil flow may be provided. The axial orientation and greater number of the passages may reduce the pressure loss on the oil stream.

In some operating conditions (e.g., the cold operating condition 74), a substantial pressure rise may be associated with the present design when the engine starts up and the oil is cold. To address that pressure rise, the present design may include two larger flow passages formed in the outlet guide vane (e.g., the lubricant supply and discharge ducts 50, 52) that may be associated with minimal pressure rise of the oil as the oil flows through them.

When the oil is cold, minimal oil may flow through the small passages, but a lubricant pressure difference (e.g., between the ducts 50, 52) may be sufficiently high to open the back pressure regulator to allow oil to flow through the larger passages. When the oil flows through the two larger passages, the pressure on the oil pump may be limited and the temperature of the outlet guide vane may be increased. When the temperatures of the outlet guide vane and the oil flowing through the outlet guide vane have increased, more oil may begin to flow through the smaller passages. At that time, the lubricant pressure difference may become small enough that the back pressure regulator may close, thereby causing substantially all of the hot oil to flow through the small oil channels.

At least one of the outlet guide vane core and the sheet may be made from aluminum or titantium. However, the outlet guide vane core and the sheet may be made from other materials to address the risk of foreign object damage to the outlet guide vane.

Flow sensors may be used to compare the oil flow rate going into the outlet guide vane and the oil flow rate returned from the outlet guide vane. A valve may be used to shut off flow to the outlet guide vane if some amount of oil provided to the outlet guide vane is not returned from the outlet guide vane, which may indicate that the oil has leaked into the fan bypass stream or elsewhere.

During the cold operating condition 74, lubricant may be pumped from a lubricant supply source using a pump such as a gear pump or a centrifugal pump. As the lubricant is pumped, a pressure rise across the pump may be encountered. Although the pressure rise may be insufficient to cause, or otherwise may not be associated with, significant lubricant flow through the cooling passages 24, the pressure rise may be sufficient to cause, or may otherwise be associated with, lubricant flow from the duct 50 to the duct 52 through the BPR 72. In other words, the pressure rise across the pump may be associated with a difference in lubricant pressure between the ducts 50, 52 that reaches the threshold pressure such that the BPR 72 fluidly couples the ducts 50, 52 together to conduct lubricant from the duct 50 to the duct 52 during the condition 74.

During the cold operating condition 74, a lubricant pressure difference across the cooling passages 24 may be encountered. The lubricant pressure difference may be approximately equal to the lubricant pressure difference between the lubricant supply duct 50 and the lubricant discharge duct 52 in slight excess of the threshold pressure. As such, some lubricant flow through the passages 24 may occur during the condition 74. However, the flow rate of lubricant through the passages 24 during the condition 74 may be almost negligible. For example, the flow rate of lubricant through the passages 24 during the condition 74 may be approximately 0% of the total flow rate of lubricant through the vane 20 during the condition 74.

As lubricant is pumped during the cold operating condition 74, the temperature of the lubricant may rise over time. Accordingly, temperature increases in the lubricant may cause the temperature of the lubricant supply duct 50, the lubricant discharge duct 52, the cooling passages 24, and the outlet guide vane 20 as a whole, to increase. The back pressure regulator 72 may continue to limit the lubricant pressure difference between the ducts 50, 52 in slight excess of the threshold pressure during the condition 74 as the temperature of the lubricant, the ducts 50, 52, and the vane 20 increases.

As the lubricant temperature increases, the flow rate of lubricant through the cooling passages 24 may increase. As a result of the increased temperature and the increased flow rate of the lubricant through the passages 24, the lubricant pressure difference between the ducts 50, 52 may fall below the threshold pressure of the back pressure regulator 72. When the lubricant pressure difference falls below that threshold, the BPR 72 may prevent lubricant conduction from the duct 50 directly to the duct 52 through the BPR 72 during the warm operating condition 30.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan module for a gas turbine engine, the fan module comprising
    a fan adapted to rotate about a central axis to pass air at least in part aftward along the central axis and around an engine core of the gas turbine engine,
    a plurality of outlet guide vanes spaced aft of the fan along the central axis and configured to receive the air passed aftward along the central axis by the fan,
    a fluid cooling system integral with at least one of the plurality of outlet guide vanes and configured to transfer heat from a fluid to the air from the fan to cool the fluid, the fluid cooling system including a plurality of cooling passages radially spaced from one another along the at least one outlet guide vane and extending parallel to one another along the central axis such that when fluid is conducted by the cooling passages during operation of the fan module, the cooling passages cooperate to control a pressure drop of the fluid as the fluid flows through the cooling passages to facilitate heat transfer from the fluid to the air from the fan during a first operating condition of the fan module, and
    a back pressure regulator configured to bypass the cooling passages during a second operating condition of the fan module.

2. The fan module of claim 1, wherein the cooling passages have a height and a width of equal to or less than 0.02 inches.

3. The fan module of claim 1, wherein (i) each of the cooling passages has an aft portion located a first radial distance from the central axis and a forward portion positioned forward of the aft portion along the central axis and located a second radial distance from the central axis substantially equal to the first radial distance and (ii) the cooling passages extend generally parallel to and along the central axis between the aft portions and the forward portions substantially without extending in a radial direction.

4. The fan module of claim 1, wherein the at least one outlet guide vane includes a spar defining a supply duct configured to distribute fluid to the cooling passages and a discharge duct configured to collect fluid that has passed through the cooling passages.

5. The fan module of claim 4, wherein the supply duct is formed to include a plurality of supply ports fluidly coupled to the aft portions of the cooling passages and configured to direct fluid into the aft portions of the cooling passages from the supply duct and the discharge duct is formed to include a plurality of discharge ports fluidly coupled to forward portions of the cooling passages and configured to direct fluid that has passed through the cooling passages into the discharge duct from the forward portions of the cooling passages.

6. The fan module of claim 5, wherein the at least one outlet guide vane further includes a skin coupled to the spar such that the skin defines a portion of an exterior of the at least one outlet guide vane and the skin and the spar cooperate to define the cooling passages.

7. The fan module of claim 6, wherein the skin is formed to include a plurality of lands configured to engage the spar to resist radial migration of fluid between the cooling passages when the skin is coupled to the spar and the lands partially define channels that are configured to partially define the cooling passages when the skin is coupled to the spar.

8. The fan module of claim 6, wherein a plurality of fins are bonded to the skin so that the fins extend into the cooling passages and the fins are configured to facilitate heat transfer from the fluid to the air from the fan when fluid flows through the cooling passages in use of the fan module.

9. The fan module of claim 6, wherein a plurality of fins are bonded to the spar so that the fins extend into the cooling passages and the fins are configured to facilitate heat transfer from the fluid to the air from the fan when fluid flows through the cooling passages in use of the fan module.

10. The fan module of claim 6, wherein a plurality of pin fins are etched or machined into the skin so that the pin fins extend into the cooling passages and the pin fins are configured to facilitate heat transfer from the fluid to the air from the fan when fluid flows through the cooling passages in use of the fan module.

11. The fan module of claim 6, wherein a plurality of pin fins are etched or machined into the spar so that the pin fins extend into the cooling passages and the pin fins are configured to facilitate heat transfer from the fluid to the air from the fan when fluid flows through the cooling passages in use of the fan module.

12. A gas turbine engine comprising
    an engine core defining a central axis,
    a fan coupled to the engine core to be driven by the engine core to rotate about the central axis to pass air at least in part aftward along the central axis around the engine core,
    a plurality of outlet guide vanes spaced aft of the fan along the central axis and configured to receive the air passed aftward along the central axis by the fan, and
    a fluid cooling system integral with at least one of the plurality of outlet guide vanes and configured to transfer heat from a fluid to the air from the fan to cool the fluid, the fluid cooling system including (i) a supply duct, (ii) a discharge duct sized to receive fluid from the supply duct, (iii) a plurality of cooling passages extending between the supply duct and the discharge duct and configured to conduct fluid provided by the supply duct to transfer heat from the fluid to the air from the fan to cool the fluid during a warm operating condition of the gas turbine engine, and (iv) a back pressure regulator configured to fluidly couple the supply duct to the discharge duct during a cold operating condition of the gas turbine engine to conduct fluid directly from the supply duct to the discharge duct during the cold operating condition.

13. The gas turbine engine of claim 12, wherein the back pressure regulator is configured to fluidly couple the supply duct to the discharge duct during the cold operating condition of the gas turbine engine to conduct fluid directly from the supply duct to the discharge duct when a difference in fluid pressure between the supply duct and the discharge duct is above a threshold pressure.

14. The gas turbine engine of claim 13, wherein the back pressure regulator is configured to at least partially block fluid from being conducted directly from the supply duct to the discharge duct during the warm operating condition of the gas turbine engine.

15. The gas turbine engine of claim 12, wherein each of the cooling passages has an aft portion fluidly coupled to the supply duct and located a first radial distance from the central axis and a forward portion fluidly coupled to the discharge duct, positioned forward of the aft portion along the central axis, and located a second radial distance from the central axis substantially equal to the first radial distance and the cooling passages extend along the central axis between the aft portions and the forward portions substantially without extending in a radial direction such that when fluid is conducted by the cooling passages away from the aft portions to the forward portions during the warm operating condition of the gas turbine engine, the cooling passages cooperate to control a pressure drop of the fluid as the fluid flows through the cooling passages to facilitate heat transfer from the fluid to the air from the fan.

16. The gas turbine engine of claim 12, wherein the supply duct and the discharge duct are defined by a spar included in the at least one outlet guide vane and the cooling passages are cooperatively defined by the spar and a plurality of channels formed in a skin that is coupled to the spar.

17. The gas turbine engine of claim 16, wherein a plurality of fins are bonded to one or more of the skin and the spar so that the fins extend into the cooling passages and the fins are configured to facilitate heat transfer from the fluid to the air from the fan when fluid flows through the cooling passages during the warm operating condition of the gas turbine engine.

18. A fan module for a gas turbine engine, the fan module comprising a fan adapted to rotate about a central axis to pass air at least in part aftward along the central axis and around an engine core of the gas turbine engine, a plurality of outlet guide vanes spaced aft of the fan along the central axis and configured to receive the air passed aftward along the central axis by the fan, and a fluid cooling system integral with at least one of the plurality of outlet guide vanes and configured to transfer heat from a fluid to the air from the fan to cool the fluid during a first operating condition of the fan module, the fluid cooling system including (i) a supply duct having a plurality of supply ports, (ii) a discharge duct having a plurality of discharge ports, (iii) a plurality of cooling passages radially spaced from one another and extending between the supply ports and the discharge ports parallel to one another, wherein the cooling passages each have a height and width of equal to or less than 0.02 inches, and (iv) a back pressure regulator configured to bypass the cooling passages during a second operating condition of the fan module.

19. The fan module of claim 18, wherein each of the cooling passages extends between a first supply port and a first discharge port over the shortest arcuate path measured between the first supply port and the first discharge port along an exterior-most surface of the at least one outlet guide vane.

20. The fan module of claim 18, wherein (i) the supply duct and the discharge duct are defined by a spar included in the at least one outlet guide vane and (ii) the cooling passages are cooperatively defined by the spar and a plurality of channels formed in a skin that is coupled to the spar.

* * * * *